United States Patent [19]
Deiss et al.

[11] Patent Number: 5,658,100
[45] Date of Patent: Aug. 19, 1997

[54] INTERLOCKING, OR FORM FITTING CUTTING BIT OR CHIP

[75] Inventors: Siegfried Deiss, Gomaringen; Siegfried Bohnet, Mössingen; Hans Peter Durr, Gomaringen-Stockach; Thomas Schneider, Hirrlingen, all of Germany

[73] Assignee: Walter AG, Tübingen, Germany

[21] Appl. No.: 515,965

[22] Filed: Aug. 16, 1995

[30] Foreign Application Priority Data

Aug. 25, 1994 [DE] Germany ............... 44 30 171.5

[51] Int. Cl.⁶ .................................. B23B 27/22
[52] U.S. Cl. ................. 407/35; 407/104; 407/48; 407/53
[58] Field of Search ............... 407/35, 40, 42, 407/43, 47, 48, 53, 65, 102, 103, 104, 106, 109, 111, 113

[56] References Cited

U.S. PATENT DOCUMENTS

| | | | |
|---|---|---|---|
| 3,488,823 | 1/1970 | Wirfelt | 407/103 |
| 3,946,472 | 3/1976 | Proulx et al. | 407/113 X |
| 4,477,212 | 10/1984 | Kraft | 407/109 X |
| 4,552,491 | 11/1985 | Parker | 407/113 X |
| 4,606,678 | 8/1986 | Zweekly | 407/116 X |
| 4,697,963 | 10/1987 | Luck | 407/48 X |
| 4,988,242 | 1/1991 | Pettersson et al. | 407/115 X |
| 5,236,288 | 8/1993 | Flueckiger . | |
| 5,456,557 | 10/1995 | Bernadic et al. | 407/115 X |

FOREIGN PATENT DOCUMENTS

| | | |
|---|---|---|
| 0 307 949 A1 | 3/1989 | European Pat. Off. . |
| 0 432 340 B1 | 6/1991 | European Pat. Off. . |
| 0 545 669 A1 | 6/1993 | European Pat. Off. . |
| 28 26 564 | 1/1979 | Germany . |
| 36 42 514 C1 | 6/1988 | Germany . |
| 37 15 338 A1 | 11/1988 | Germany . |
| 9201113 U1 | 2/1993 | Germany . |
| 9201113 U | 4/1993 | Germany . |
| 9305518 U1 | 7/1993 | Germany . |
| 42 44 316 A1 | 6/1994 | Germany . |
| 1052345 | 11/1983 | U.S.S.R. ............... 407/66 |
| 000795993 | 6/1958 | United Kingdom ........ 407/47 |
| WO 90/05608 | 5/1990 | WIPO . |

*Primary Examiner*—Daniel W. Howell
*Assistant Examiner*—Henry W. H. Tsai
*Attorney, Agent, or Firm*—Frishauf, Holtz, Goodman, Langer & Chick, P.C.

[57] ABSTRACT

A cutting bit formed as a round plate for a material removal tool has a base body, which is defined by a bottom face, a top opposite it and spaced apart from it, and a side face between them. The side face, with a chip face located on the top, defines a circular cutting edge. For securing the bit, a central opening which can receive a securing screw, for instance, is provided. To secure the cutting bit in a tool body in a manner fixed against relative rotation, a plurality of depressions, for instance, are provided on the top of the cutting bit and can be engaged by a clamping claw supported on the tool body. Circumferential forces engaging the cutting bit are diverted by way of these depressions, thus preventing torsion or twisting of the cutting bit.

31 Claims, 7 Drawing Sheets

INTERLOCKING, OR FORM FITTING CUTTING BIT OR CHIP

Reference to related disclosures:
German Utility Model G 93 05 518.3 U1
European patent disclosure EP 0 432 340 B1
German Patent 36 42 514 C1
European patent disclosure EP 0 307 949 A1
German Utility Model G 92 01 113.6 U1
European patent disclosure EP 0 545 669 A1

FIELD OF THE INVENTION

The apparent invention relates to round cutting chips or bits used on machine tools.

BACKGROUND

In material removing machining of workpieces, cutting bits embodied as round plates or bits and retained in a chip removal or material removal tool, hereinafter called machining tool for short, are often used as elements such as the cutting tool. They are distinguished by a circular cutting edge that is concentric to their longitudinal center axis. The round bits are rotationally symmetrical with respect to the longitudinal center axis and have a securing opening that is coaxial with that axis. In the installed state, a securing screw extends through this opening, thereby retaining the round bit in a suitable receptacle of the machining tool. The round bit is often fixed in such way that its longitudinal center of axis is at an acute angle to the direction of relative motion between the tool and the workpiece. This means that the cutting edge, as it is fed, is not at a right angle to the direction of motion, and reaction forces which can have force components acting circumferentially of the round bit are exerted upon the round bit during machining.

Such a force component generates a torque acting on the round bit that can cause torsion or twisting of the round bit unless the force is diverted entirely into the machining tool. However, depending on the direction of rotation, such torsion of the round bit can cause the securing screw to loosen, or to become so tight that it can no longer be loosened at all. A loosened round bit can damage the remainder of the milling tool head and must absolutely be avoided. Unintended tightening and seizing of the securing screw must also be prevented.

In the industry, round bits intended for milling tool heads are known that have an annular basic body and form fitting or interlocking coupling between the round bit and a milling body. The round bit has a planar bottom face and an annular chip face that is spaced apart from the bottom face on the opposite side of the basic body. A curved side face, between the cutting and bottom faces, extends around the circumference of the annular basic body. The side face is provided with plane surfaces adjacent to one another, which are arranged obliquely both to one another and to the bottom face, so that the side face is bounded polygonally at the bottom face, and the chip face is bounded by the circular cutting edge. The receptacle provided in the milling tool head is also provided with a polygonal wall, which is contacted by the side wall of the round bit, so that the round bit. is in form fitting or interlocking engagement with the body of the milling tool head.

Torque acting upon this round bit is translated by the plane surfaces supported against the wall into a radial force acting upon the securing screw, which can cause the round bit to come out of adjustment in the milling tool head.

German Utility Model G 93 05 518.3 U1 discloses a similar round bit, which on its side face, here called its circumferential. face, has a total of eight plane surfaces that act as positioning faces for positioning the round bit in the milling tool head. The round bit is secured against torsion by the positioning faces as they contact corresponding bearing faces of the miller; once again, the torque on the round bit can produce radial reaction forces.

In the polygonal cutting bit described in European Patent disclosure EP 0 432 340 B1 as well, lateral positioning faces serve to position the bit and secure it against torsion.

Moreover, German Patent DE 36 42 514 C1 discloses a polygonal cutting bit with curved cutting edges, a total of three of which are provided in a side face extending between a plane top and a plane bottom face parallel to it. The bearing or positioning faces are curved in a plane parallel to the bottom face, and the radius of curvature is greater than that of the associated remaining side face. The positioning faces are braced against suitably curved faces provided on the milling tool head. Reaction forces that are produced are absorbed by a securing screw, which extends through a central opening in the cutting bit, and are diverted into the milling tool head.

Cutting bits of this kind are also known from European Patent Disclosure EP 0 307 949 A1; here the bearing or positioning faces are planar, however, and contact corresponding, likewise planar seat faces of a ball miller. Once again, as in the milling tool heads described above, wedge forces acting on the cutting bit can arise at the bearing or positioning faces.

A fundamentally different way to secure round bits against torsion is disclosed by German Utility Model G 92 01 113.6 U1. It describes a substantially frustoconical cutting bit with a plane top and a side face resting on a conical jacket. The side face is adjoined by a bottom face that is provided with grooves extending radially to the axis of symmetry of the round bit. The grooves are distributed uniformly, so that any two grooves adjacent to one another form the same angle as any other two adjacent grooves. A central opening leads through the cutting bit to receive a securing screw. A machining tool provided for receiving the cutting bit has a receptacle with a seat face into which a pin is inserted that engages one of the grooves when the cutting bit is secured to the tool.

Instead of the grooves, small indentations bounded on all sides and receiving the pin may be provided on the bottom face.

A separate alignment pin must be provided on the machining tool. Moreover, in this cutting bit the bottom face serving as the bearing face, which is exposed to considerable pressure per unit of surface area during use of the milling tool head, is reduced in size by the recesses. As a result, the force acting on the seat face associated with the bottom face and provided on the base body of the milling tool head is unevenly distributed.

European Patent Disclosure EP 0 545 669 discloses a similar cutting bit, which has a cylindrical base body with a central securing opening. The base body is provided on its bottom face with a total of four grooves extending radially outward, one of which cooperates with a corresponding alignment pin provided in the seat face of the machining tool.

Once again it is necessary to provide a separate alignment pin in the machining tool, and the result once again is an uneven distribution of force over the seat face.

Moreover, it is known in the industry to provide recesses in the side face of round bits, in order to secure them in form fitting or interlocking fashion against torsion in a machining tool. The recesses cooperate with corresponding protrusions provided on a lateral support surface of the machining tool. If the lateral support surface is to be able to perform its supporting task, these protrusions required high-precision machining.

Finally, it is known in the industry to secure cutting bits without a central opening to a basic tool body by means of clamping claws, which engage a central indentation provided in the top of the cutting bit. By means of the clamping claw, the cutting bit is pressed against a seat face provided on the base body of the tool and is retained thereon.

THE INVENTION

It is an object to create a cutting bit for a material removal or machining tool that can be secured to and securely held on the tool and that in particular can be secured in a simple way against torsion.

Briefly, because the cutting bit is secured in a manner fixed against relative rotation by a coupling arrangement, which includes recesses or protrusions forming surface formations on the bit, for coupling with a securing claw with complementary claw surface formations, i.e. protrusions or recesses, attached to the tool body. It is possible, for example, to position the cutting bit obliquely relative to the direction of relative motion between the machining tool and the workpiece; circumferential components of the resultant forces are diverted into the base body of the machining tool by the form fitting or interlocking arrangement. As a result, the cutting bits do not twist during the machining of a workpiece, and hence the central securing screw that by way of example acts as a securing means is thus neither loosened nor tightened.

Because the form fitting securing of the cutting bit in the base body of the machining tool is accomplished solely from the top, the annular bottom face of the cutting bit can be made uninterrupted, i.e. without such intervening features as grooves, bores or the like. Hence the bottom face rests continuously against a seat face, assigned to it, of the machining tool. Thus the considerable cutting forces exerted on the cutting bit subject the seat face to pressure not merely at intermittent areas but rather evenly over its entire surface. Because the load is even, the cutting bit is not deformed and hence is not damaged. In particular, the production of steps, edges, shoulders or the like in the region of the seat face, which can happen if there are grooves or recesses in the bottom face of a cutting bit, is precluded.

The situation is similar for the action of the side face of the cutting bit on the corresponding bearing face on the machining tool. Once again, contact over the entire surface can be brought about, and pressure marks do not ensue, either on the side face provided on the cutting bit or on the bearing face associated with that side face.

It is advantageous if the coupling means is formed such that the cutting bit can be secured to the machining tool in a manner fixed against relative rotation in a plurality of rotational positions, differing from one another by an axis of symmetry that is vertical to the plane of the bottom face. The cutting bit, whose cutting edge in machining then comes to engage a workpiece only in intermittent regions, can then be rotated onward, as this portion of the cutting edge wears, and secured to the machining tool in a new rotational position, in which it is once again secured against relative rotation. In accordance with a feature of the invention, a coupling arrangement is provided which includes a group of recesses or protrusions, spaced apart from one another and preferably arranged on a circle that is concentric with the axis of symmetry. If they are at identical angular intervals of 60° or 45°, the cutting bit can be secured so as to be fixed against relative rotation in six or eight different positions. The coupling means, or in other words the at least one recess or the at least one protrusion, can be arranged intermittently in or on the chip face, and it has been demonstrated that the flow of chips is hindered only insignificantly thereby. The counterpart required for the coupling means does not significantly hinder the flow of chips, either.

Both on the seat face of the machining tool and on the bearing face adjoining it, no coupling means whatever—such as protrusions, recesses, or the like—are needed, and thus both faces can be made smooth. In particular, alignment pins or the like inserted into the machining tool are unnecessary. It is therefore possible as needed to use even conventional cutting bits without torsion prevention, if the specific instance does not require torsion prevention. This can be the case if work is done at low cutting speeds, or in machining workpieces of relatively soft material, or if for whatever other reasons the torque acting on the cutting bit is slight.

The coupling means with a form fitting or interlocking effect may be formed such that it reinforces the action of the securing means that passes through the cutting bit, and that it brings about not only the security against torsion but also locking of the cutting bit in the milling tool head. Especially if it engages the portion of the cutting edge remote from the active cutting edge of the cutting bit eccentrically, then it can provide security against tilting, thus exerting an initial stress on the cutting bit that counteracts the tendency of the cutting bit to tilt.

DETAILED DESCRIPTION

Figure 1:
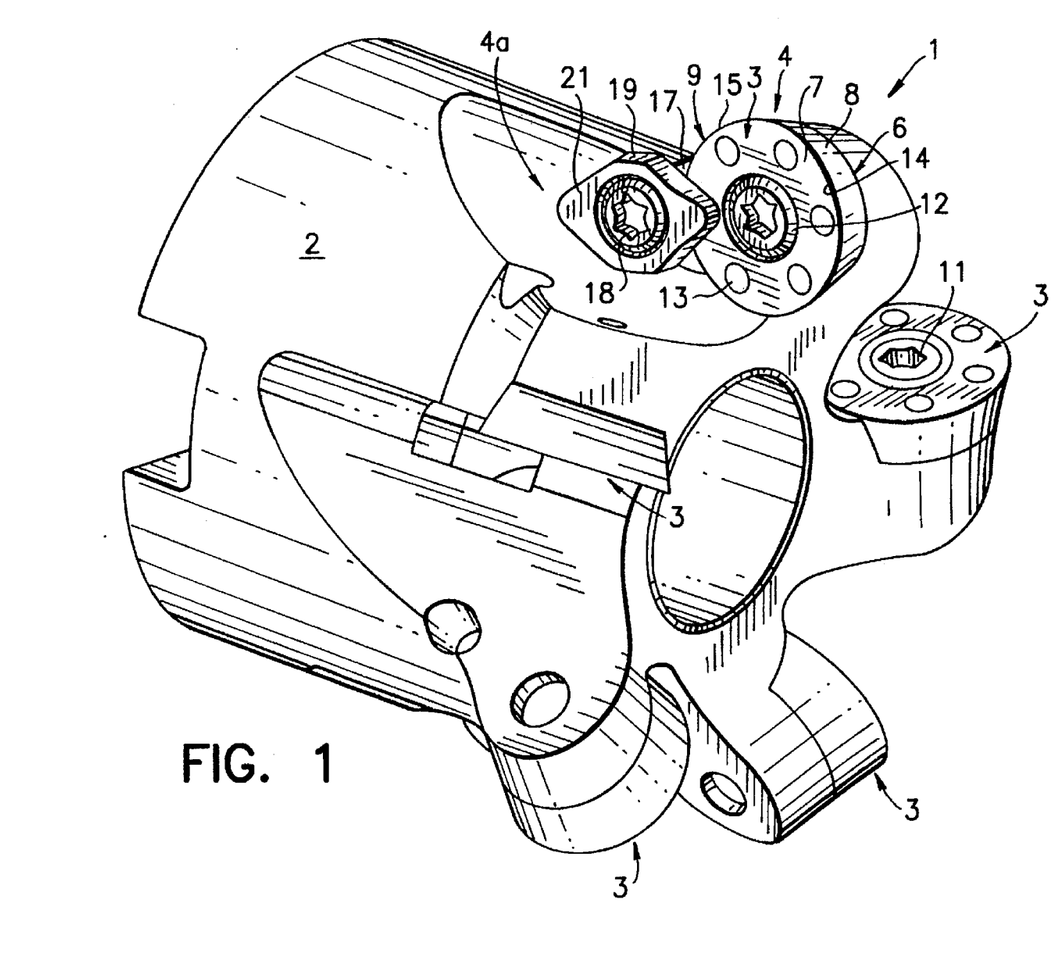
FIG. 1, in a perspective view on a larger scale, shows a milling tool head equipped with cutting bits formed as round bits, in which clamping claws or lugs are assigned to the cutting bits for the sake of securing them, in a manner fixed against relative rotation, in the milling tool head.

FIG. 1 shows a milling tool head 1, which has a total of five cutting bits 3 retained in a tool body 2. The cutting bits are located on the face end, each in a corresponding receptacle 4, forming a bit seat, of the tool body 2. The cutting bits 3 protrude at the end and laterally beyond the otherwise essentially cylindrical tool body 2. The cutting bits 3 are positive bits, formed as round bits. They are also retained with a positive radial and axial angle in the tool body 2. This milling tool head 1 is versatile and is suitable for face milling, oblique milling, circular milling, and countersinking.

Each cutting bit 3 is essentially in the form of a truncated cone and has a base body 8 that is provided with a planar, circular bottom face 6, a likewise circular top 7 spaced apart from it, and a side face 9 located on a conical jacket. The base body 8 of the cutting bit 3 is provided in the middle with a through opening 11, seated in which is a securing screw 12 that is screwed into the tool body 2 and keeps the cutting bit in the receptacle 4.

To secure the cutting bit 3 to the tool body 2 in a manner fixed against relative rotation, a total of six depressions 13 are provided in the top 7 of the cutting bit 3; they are spaced apart by some distance from a circular cutting edge 14 located between the side face 9, acting as a free face, and a chip face 15 that is provided in the top 7. One of the depressions 13 is engaged by a convex end 17 of a clamping claw 19 that is secured to the tool body 2 by a further securing screw 18. The end 17 the clamping claw 19 is in form fitting or interlocking engagement with the cutting bit 3. The clamping claw 19 is also in form fitting or interlocking engagement with the tool body 2, for which purpose its end 21 opposite the end 17, with a convex portion, engages a corresponding opening 22, which can be seen in FIG. 2. Embodiments are also possible in which the clamping claw 19 is at least partly received with its portion 21 in a corresponding indentation of the chip space 4a. In this way, torsion or twisting of the clamping claw 19 about its securing screw 18 is prevented even if it is braced with its portion 21 on a flat surface (that is, one without any opening 22) against the tool body 2.

Figure 2:
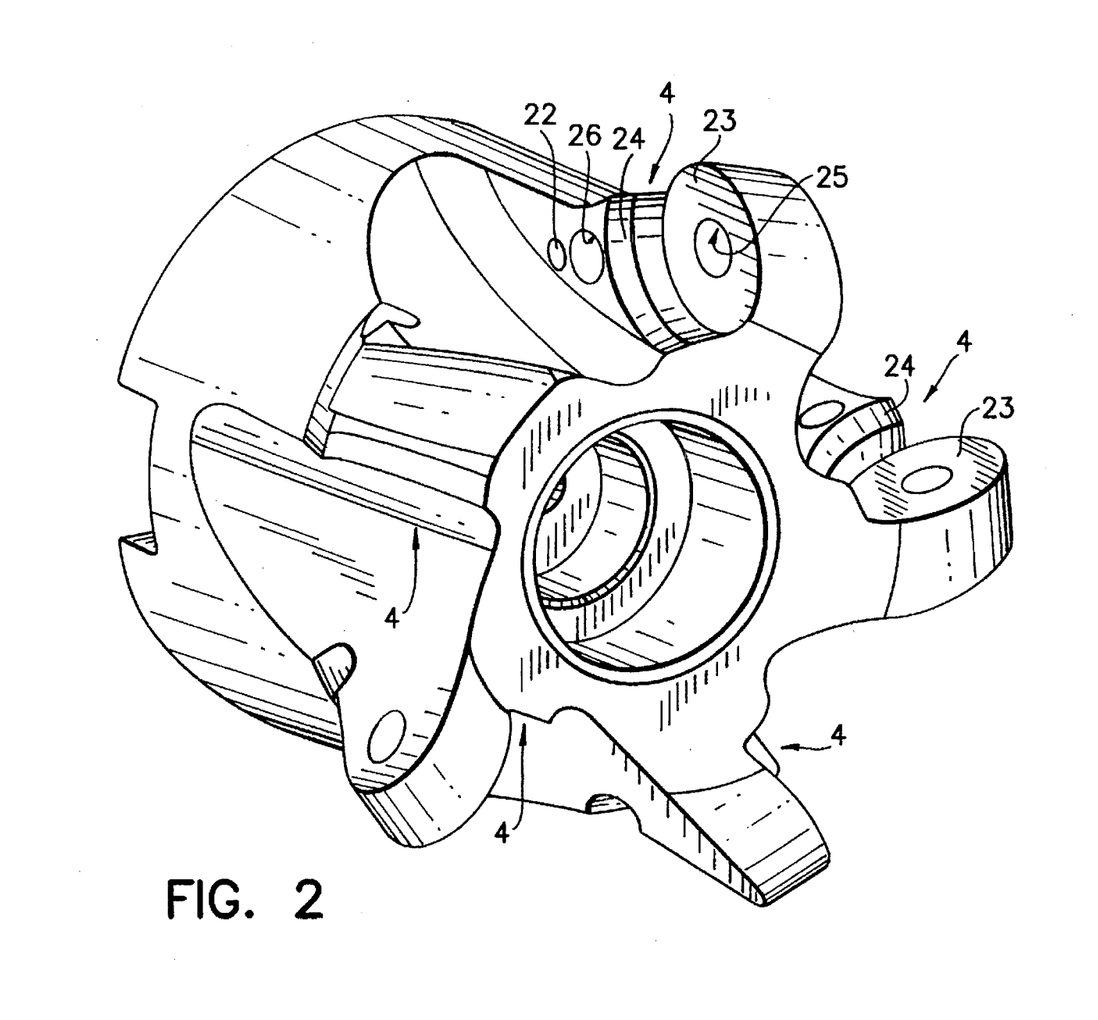
FIG. 2 shows the milling tool head of FIG. 1 with the cutting bits removed, to render the corresponding seat and bearing faces visible.

The receptacles 4 can also be seen more clearly in FIG. 2. For direct contact with the bottom face 6 or 1 at 3, a circular, planar seat face 23 is provided in each receptacle 4. The seat face is adjoined, via a partially cylindrical surface not identified by reference numeral, by a bearing face 24 at an angle to it, which in its curvature and inclination matches the side face 9 of the cutting bit 3, and whose circumferential length is longer than one-fourth of the circumference of the cutting bit 3. A threaded bore 25 is disposed at least approximately centrally in the seat face 23, in order to receive the securing screw 12. Between the opening 22 and the threaded bore 25, a further threaded bore 26 is provided, for receiving the securing screw 18 of the clamping claw 19. The threaded bore 26 is essentially parallel to the threaded bore 25. The chip spaces 4a (FIG. 1), in the form of recesses provided in the tool body 2, are large enough to assure adequate removal of chips produced during machining.

The cutting bits 3, secured in the milling tool head 1 as it has been described thus far, are doubly retained. By means of the central securing screw 12, the cutting bit 3 is pressed with its bottom face 6 against the seat face 23; the side face 9, as a consequence of a slight offset of the axis of the threaded bore 25 and of the axis of the opening 11 of the cutting bit, presses it firmly against the bearing face 24. The position of the cutting bit 3, and in particular the axial and radial angles established in the process, along with the surface area described by the cutting edge 14 are all precisely defined as a result.

Clamping claw 19, engaging one of the recesses 13, is joined in form fitting manner both to the cutting bit 3 and, via the opening 22, to the tool body 2, and thus formed with protrusions engaging the recesses. It prevents torsion of the cutting bit 3 about a longitudinal center axis of the cutting bit 3 that is defined by the securing screw 12. If during material removing machining a force component arises that acts in the direction of the circumference of the cutting bit 3, the resultant torque is absorbed by the clamping claw 13 and diverted into the tool body 2. The cutting bit 3 is thereby secured against torsion, and as a result the securing screw 12 is neither loosened nor excessively tightened.

The clamping claw 19, when the securing screw 18 is firmly tightened, exerts considerable force on the top 7 of the cutting bit 3. This force is exerted approximately vertically on the top 7 and thus is perpendicular to the seat face 23 as well. This force counteracts any tendency to tilting, so that regional lifting of the bottom face from the seat face (tilting) is averted. This means that even very powerful forces engaging the active cutting edge 14 are compensated for. Otherwise, in unfavorable cases, and especially when they occur intermittently, as is the case in roughing milling and the like, as well as in cases when the cutting bit 3 is not in durable engagement with the workpiece, such forces put a unilateral load on the cutting bit thus causing it to tilt about an axis that is crosswise to the securing screw 12. This arises due to a certain elasticity and resilience of the securing screw 12. As a result of the clamping claw 19, the rigidity with which the bit is secured is increased enough that such tilting of the cutting bit 3 is reliably precluded.

Figure 3A:
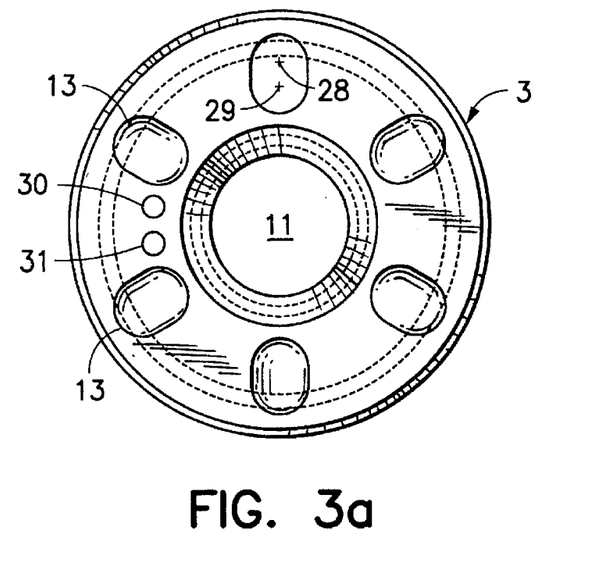
FIG. 3a, in a top view on a larger scale, shows the cutting bit provided in the milling tool head of FIG. 1.
Figure 3B:
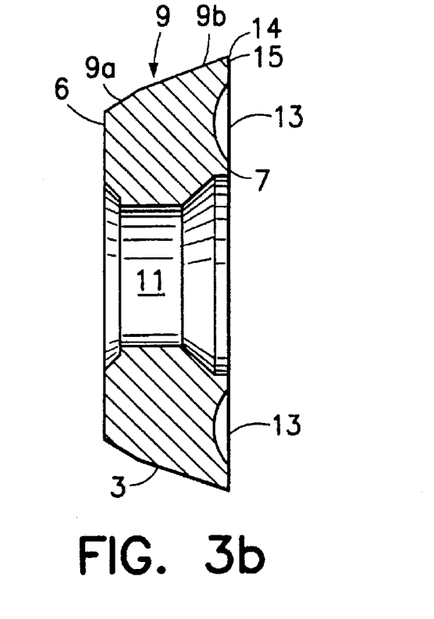
FIGS. 3b, in a sectional view along a plane that contains the axis of symmetry of the cutting bit and in a section of a greatly enlarged detail, respectively, show the cutting bit provided in the milling tool head of FIG. 1.
Figure 3C:
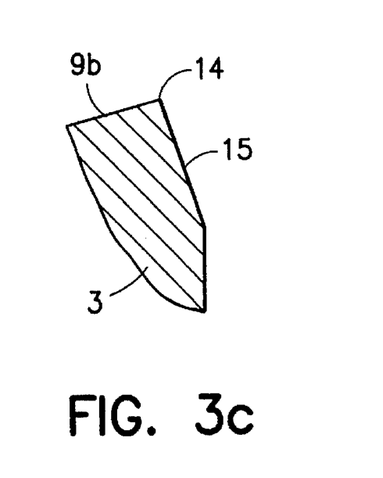
FIG. 3c is a fragmentary cross section of the bit adjacent the cutting edge.

In FIGS. 3a, 3b and 3c, the cutting bit 3 is shown separately. The bottom face 6 is plane and annular, without any interruption whatever. Parallel to and spaced apart from the bottom face 6, on the opposite side of the base body 8, is the likewise planar top 7. The side face 9 is in two parts; one portion 9a, adjoining the bottom face 6, merges via an annular edge that is parallel to the bottom face 6 with the other portion 9b, which with the portion 9a forms an obtuse angle that is open toward the center of the cutting bit.

Figure 3D:
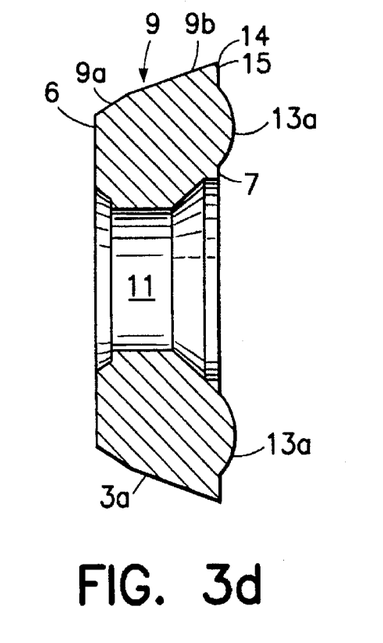
FIG. 3d is a view similar to FIG. 3b, and illustrating another embodiment

The depressions 13 are located in the top 7, adjoining the cutting edge 14 and extending into the chip face 15. As FIG. 3a shows, the depressions 13 are at 60° intervals from each other. Each depression 13 is oval and is formed by two opposed semicircular portions joined together by two side portions that are parallel to one another. The semicircular portions define two centers of curvature 28, 29, which are located on a straight line extending radially of the cutting bit 3. Rather than forming the cutting bit 3 with depression 13, it can be formed with protrusions or projections 13a, as shown on bit 3a in FIG. 3d. The clamping jaw 19 then must be shaped complementarily to insure a form fitting engagement of the clamping jaw 19 with the bit 3a.

To make it clear where the cutting bit 3 is to be installed, two smaller indentations 30, 31 are located between two depressions 13 and act as markers.

The opening 11 shown in cross section in FIG. 3b is concentric with the base body 8 of the cutting bit 3; from the base body 6 to about the middle of the cutting bit 3 this opening is cylindrical, and from there, beginning at the middle of the cutting bit 3, it widens conically toward the top 7. This makes it possible to insert the cutting bit 3 with the securing screw 12, which has a conical head, into the tool body 2 in such a way that the side face 9 is pressed firmly against the bearing face 24. The conical portion of the bore 11 and the conical head of the securing screw 12 then cooperate as wedge surfaces.

Figure 4A:
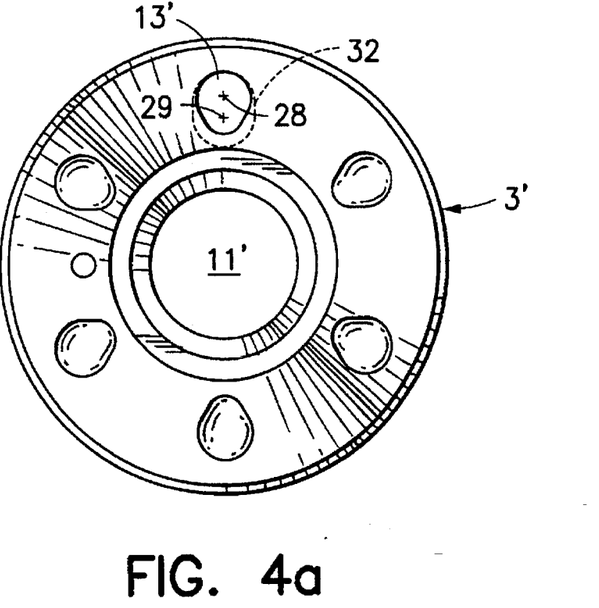
FIG. 4a is a schematic plan view of another embodiment of a cutting bit.
Figure 4B:
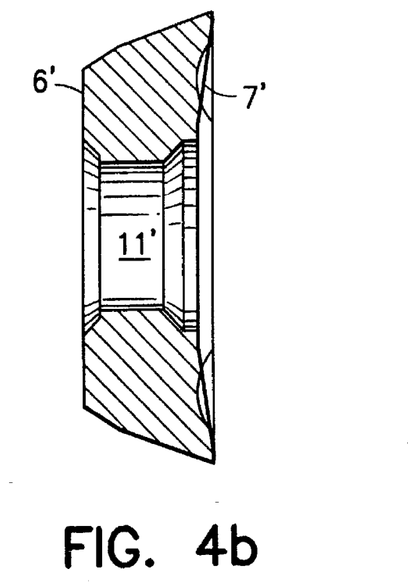
FIGS. 4b, 4c and 4d are sectional views, on different scales, of the cutting bit of FIG. 4a, taken along a plane that includes the axis of symmetry.
Figure 4C:
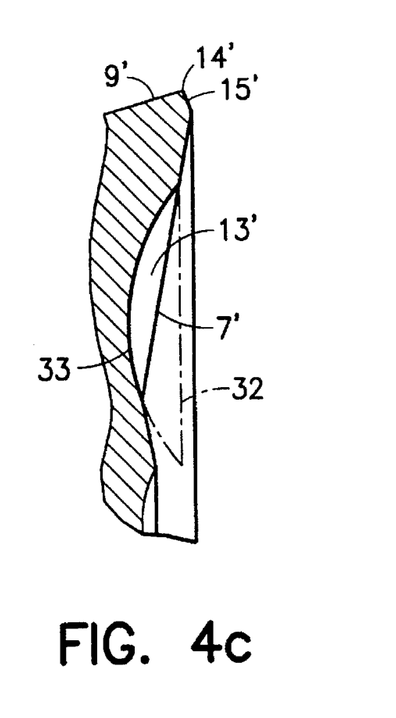
Figure 4D:
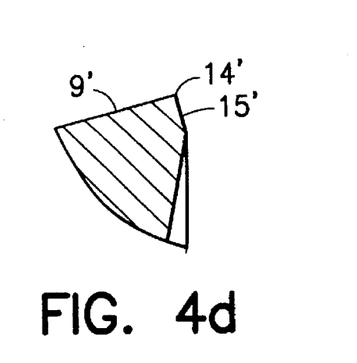

A cutting bit 3' with a strongly positive cutting geometry is shown in FIGS. 4a, 4b, 4c and 4d. This cutting bit 3' demands less cutting force and can be driven at high feeding speed. It is largely equivalent to the cutting bit 3 described above, and so for the sake of clarity, without repeating the description, the same reference numerals can be used, with the addition of a prime ('). The difference between the cutting bit 3' and the cutting bit described above is above all that the top 7' is formed by the circumference of a truncated circular cone, which opens away from the cutting bit 3, as can be seen especially from FIGS. 4b and 4c. In the immediate vicinity of the cutting edge 14', it is possible, as shown in FIG. 4d, for the top 7' to be beveled again in the opposite direction, so that at the cutting edge 14 there is approximately a right angle between the side face 9' and the portion of the chip face 15' immediately adjacent to the cutting edge 14'.

Because of the inclination of the top 7' relative to the bottom face 6', the depressions 13' are partly chamfered, as suggested by the dot-dash lines 32 in FIGS. 4a and 4c. As a result, they look egg-shaped in FIG. 4a, each with their more pointed end pointing radially inward. In particular, however, as in the above-described cutting bits 3, the centers of curvature 28, 29 are located both on a radial and on a bottom portion 33 of the depression 13' that is parallel to the bottom face 6.

Figure 5:
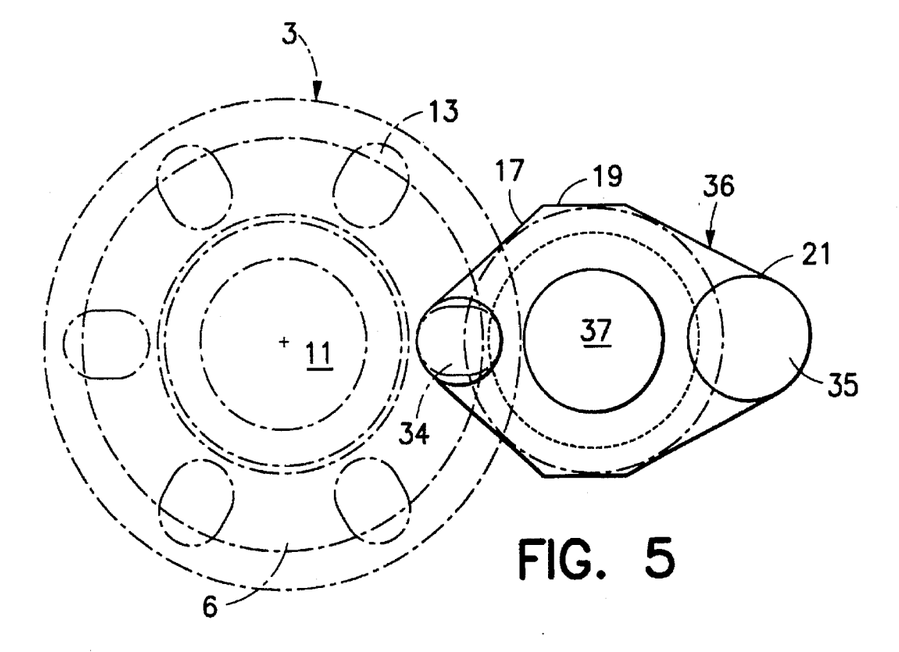
FIG. 5 is a view from below, on a larger scale, of a clamping claw connected to the cutting bit of FIGS. 3a, 3b and 3c.
Figure 6:
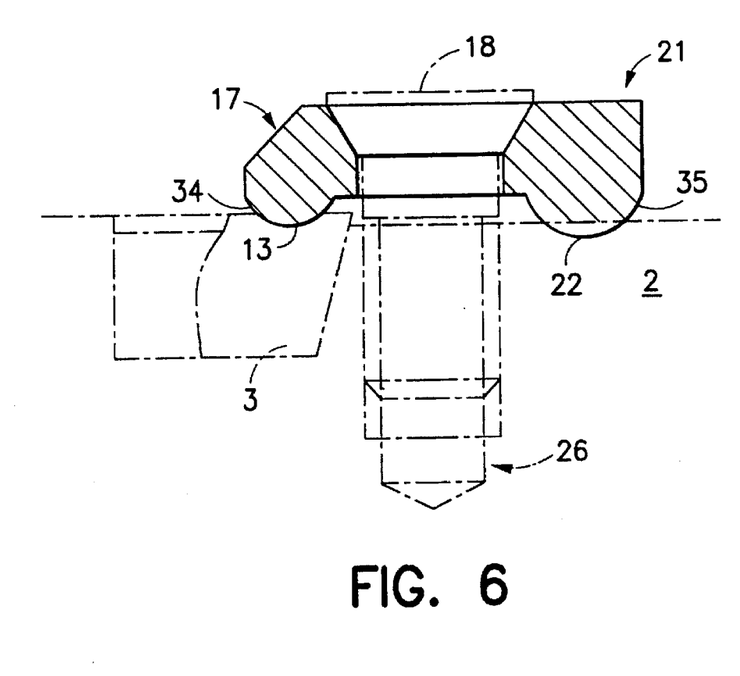
FIG. 6 is a sectional view of the clamping claw and the cutting bit of FIG. 5.

The cooperation of the clamping claw 19 with a cutting bit 3 or 3' can be seen from FIGS. 5 and 6. In FIG. 5, the one-piece clamping claw 19 is guided from below, in other words looking toward its spherically convex coupling portions 34, 35 located on the ends 17, 21. The cutting bit 3, which intrinsically covers both the end 17 and the coupling portion 34, has its bottom face 6 toward the observer and its edges are merely suggested by dot-dash lines.

The clamping claw 19, as can also be seen from FIG. 6, is formed essentially by a flat plate 36, through the center of which there is a securing opening 37 and on whose ends the coupling portions 34, 35 are formed. The clamping claw 19 is designed with dimensions such that the plate 36 is braced with its coupling portion 34 in the surface formation of the bit 3, formed by the depression 13 of the cutting bit 3 and with its coupling portion 35 in the tool body surface formation formed by the depression 22 of the tool body 2 and diverts the tension, exerted by the securing screw 18 seated in the threaded bore 26, to the depression 13 and the depression 22 and is thus braced there. The clamping claw 19 thus exerts a strong compressive force on the cutting bit 3 when the securing screw 18 is tightened. As a result, the cutting bit 3 is pressed firmly with its bottom face 6 against the seat face 23, specifically—as shown in FIG. 1—on a side that in terms of the securing screw 12 is opposite the active region of the cutting edge 14. The result is that the cutting bit 3 is firmly retained, and any tendency it may have toward tilting is counteracted.

Figure 7:
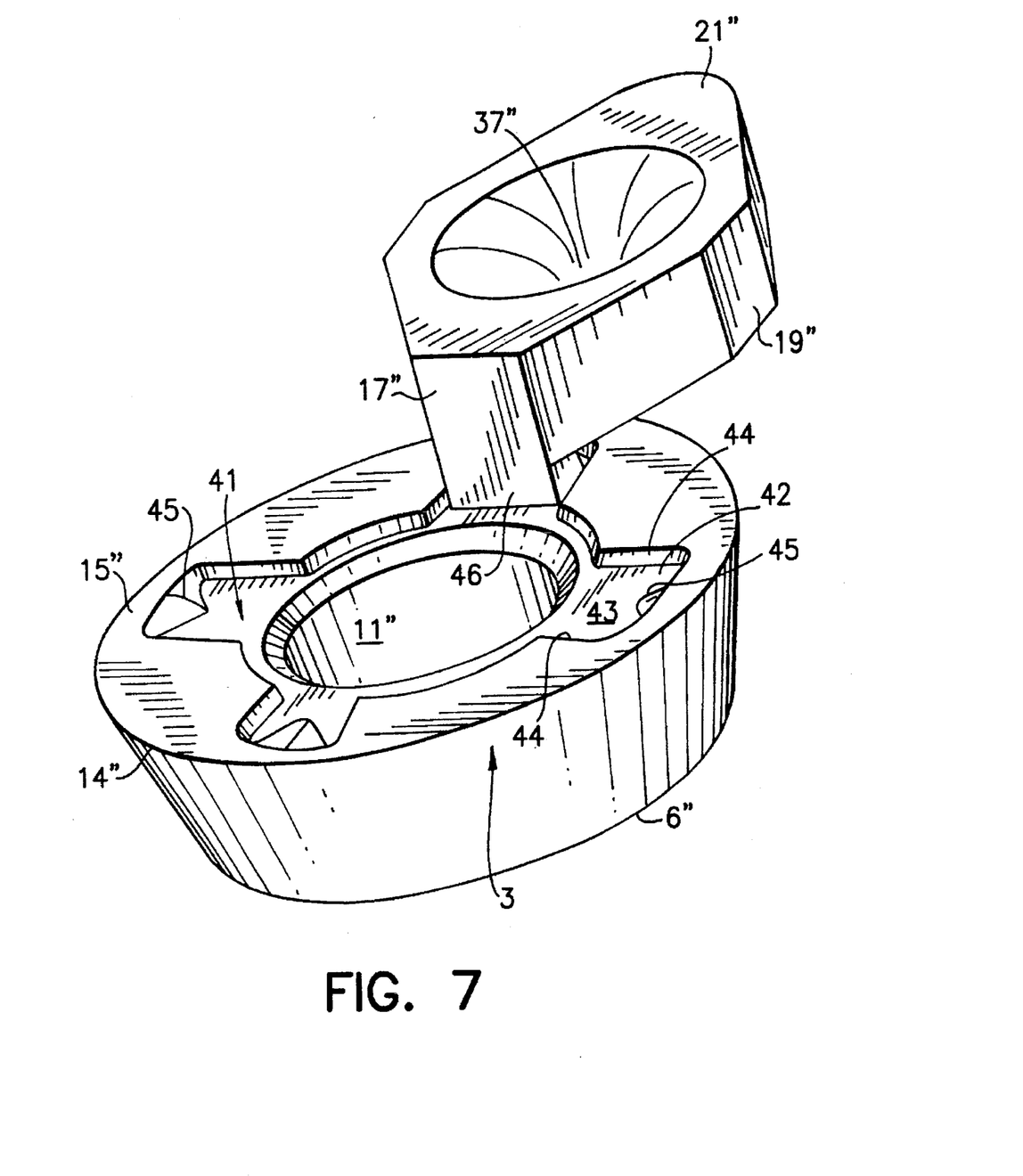
FIG. 7 schematically shows a cutting bit provided with a recess on its surface that acts as a coupling means, and a clamping claw engaging this recess.

FIG. 7 shows a cutting bit 3" in another embodiment. It differs from the cutting bit 3 described above in that instead of the recess 13, it is provided with only one recess 41, concentric to the opening 11", as its coupling means for form fitting coupling of the cutting bit 3 to the tool body 2; the recess 41 has spurs 42 extending radially outward and spaced apart from one another by 90°. Such a spur 42 is approximately rectangular in plan view and has a bottom 43 that is parallel to the bottom face 6". In the circumferential direction, the spur 42 is bounded by parallel spaced-apart side walls 44 facing one another. For rigidification and especially for diverting the cutting forces engaging the cutting edge 14", the radially outward-extending spur may be provided with a rib 45 that rises above the bottom 43, extending inward from the chip face 15" toward the bottom 43, and inclined relative to the bottom 43.

As its coupling portion on its end 17", the clamping claw 19" associated with the cutting bit 3 has a protrusion 46 complimentary shaped to the spur 42.

In this embodiment as well, form fitting or interlocking securing of the cutting bit 3" in the tool body 2 is possible; as in the preceding embodiments, the coupling portion provided on the end 21" of the clamping claw 19" may be spherically curved. As soon as the cutting bit 3" is subjected to even slight rotation, the clamping claw 19" is rotated with it, and the corresponding spherically curved coupling portion on the end 21" is then thrust some distance into the corresponding opening 22 of the tool body 2 and is thus subjected to a wedging action, which lifts the end 21" relative to the tool body 2. The clamping claw 19" now acts like a two-armed lever, with its pivot point at the securing screw 18 and the opening 37", causing the end 17" to press firmly with the protrusion 46 against the bottom 43 of the recess 41. This provides additional retention of the cutting bit 3".

Figure 8:
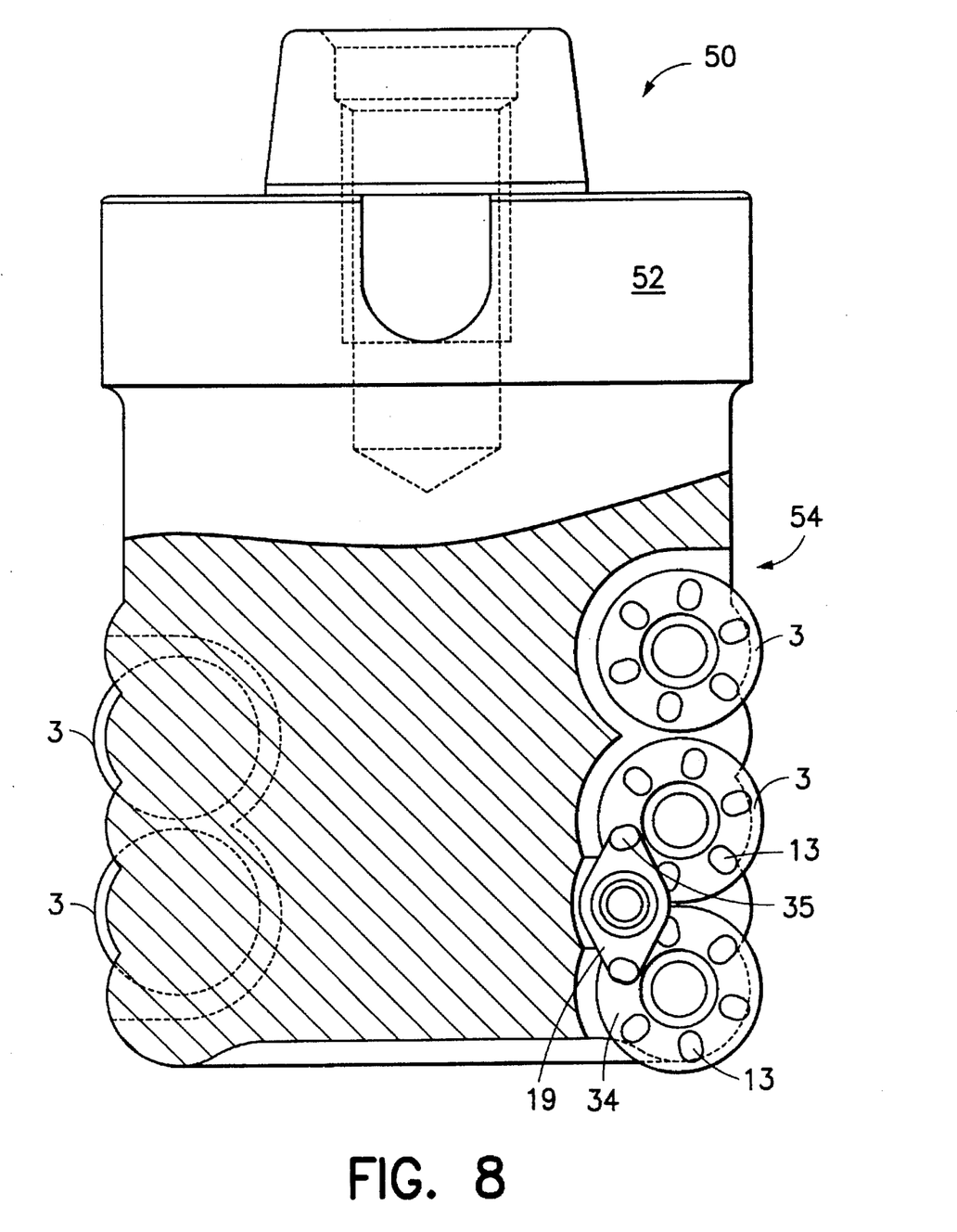
FIG. 8 is a schematic, partly cut away side view of a milling tool head with cutting bits in accordance with FIGS. 3a, 3b and 3c.

FIG. 8 shows a milling tool head 50, whose cutting bits 3 are located in receptacles 54 provided in a cylindrical tool body 52. The receptacles 54 are helical grooves with a pronounced pitch, provided in the tool body 2. Each receptacle 4 contains a plurality of cutting bits 3. Especially the cutting bits 3 located at the face end are subjected to severe torsional strain. To couple the end cutting bit 3 to the tool body 52 in a manner fixed against relative rotation, the clamping claw 19 is located between the end cutting bit 3 and the adjacent cutting bit 3; the clamping claw 19 then engages one of the depressions 13 in the end bit with its coupling portion 34 and a depression 13 of the adjacent cutting bit 3 with its coupling portion 35. As a result, both the end cutting bit 3 and the cutting bit 3 adjacent to it are joined to the tool body 52 in a manner fixed against relative rotation. The version also makes it possible, however, to locate the two cutting bits 3 quite close together, so that only tiny interstices remain. Moreover, weakening of the tool body 52 by additional recesses for receiving the clamping claws 19 is avoided.

The cutting bit is preferably what is known as a round bit, in which the base body, in a region located between the bottom face and the top, has an at least intermittently circular cross section that is parallel to the bottom face. This results in cutting edges in the form of arcs of a circle. If the entire cross section is circular, the cutting bit of of a type without corners. Such bits are distinguished by high material removing power and low wear. They have a circular cutting edge that is formed between the free face, formed by the side face, and the chip face contained in the top.

Although it is also possible to provide the bottom face with a polygonal edge, it is nevertheless advantageous for it to be circular. This makes the base body essentially frustoconical, as is the case with round bits with a positive free angle that are not protected against torsion.

The bottom face, preferably oriented parallel to the top, may be planar, which simplifies not only the manufacture of the cutting bit but also the manufacture and machining of the base body, intended for receiving the cutting bit, of the machining tool. Moreover, the bottom face then has no structure that would deform the seat face when subjected to compressive strain. No offsets or edges can be made in or break off from the seat face.

The cutting edge may be adjoined by a chip face in the form of a circular ring, which is either made plane and thus parallel to the bottom face or is inclined relative to the bottom face, in which case it is located on a jacket of a truncated circular cone., If needed, the chip face may also be curved in spherically concave fashion.

The coupling means providing the form fitting securing of the cutting bit in the machining tool may be formed by at least one recess provided on the top of the base body. This recess can then be engaged by a correspondingly formed counterpart that is detachably connected to the machining tool. Torque acting on the cutting bit is absorbed by this counterpart. The coupling means may equally well be formed by a protrusion provided on the top of the base body; then the counterpart includes a corresponding recess that receives this protrusion.

It has moreover been found that recesses acting as coupling means and located especially at least partly in the chip face improve the flow of the chips. The coupling means may, if embodied accordingly, act as reservoirs for cooling lubricant, which promotes the flow of chips.

The recesses may be oval, in which case their longitudinal center axis extends radially. As a result, no radial force is exerted on the cutting bit, and only the torque is absorbed. This provision compensates for any slight dimensional tolerances between the counterpart, the base body of the machining tool and the cutting bit. In addition, coolant lubricant can remain in the recesses that are not jammed by the counterpart, and this contributes to lubrication of the chip as it moves over them.

If the recess on the top of the cutting bit merges at an obtuse angle with the remainder of the top of the base body, an additional clamping effect can be attained. A spherically convexly curved surface of the counterpart then engages the recess, and via the peripheral region of the recess located obliquely to the top of the base body, torque acting on the cutting bit generates a wedging effect that presses the cutting bit against the seat face. The torque acting upon the cutting bit is thus transformed into a pressing force that reinforces the effect of the securing screw, and this force prevents torsion or twisting of the cutting bit via the friction that occurs at the seat face.

The coupling means may also be a recess, located concentrically to the base body, which has a spur, extending radially for instance, and which is engaged by a counterpart. This recess may have side Walls, oriented crosswise to the circumferential direction of the base body, that are either at right angles to the bottom face or, if an additional wedging effect is desired, are oriented obliquely to the bottom face.

At least one marker can be provided on the cutting bit 3 to enable one to identify a rotational position of the cutting bit. It may be an optically readable marking, which if formed by way of example by one recess that differs from the other recesses in an optically detectable way. This makes it possible to adjust the cutting bits in a defined manner. It can moreover be used to identify the cutting bit, for instance so that cutting bits with different chip angles can be distinguished from one another.

The cutting bit can be used for a machining tool that has a securing means, such as the aforementioned counterpart, that can be brought into engagement with the coupling means. The securing means may be in the form of a clamping claw, which on its side toward the cutting bit has a portion that is complementary in shape to the coupling means. The clamping claw may be formed such that it exerts a pressure that acts vertically on the top of the cutting bit, by which the cutting bit is additionally pressed against the seat face. The result is that even if the cutting bit is subjected to severe alternating strains during machining, for instance, the cutting bit will rest securely against the seat face without being tilted by the cutting forces. This considerably improves the locking of the cutting bit in the machining tool, which as an example may be a milling tool head.

We claim:

1. A cutting bit (3) for a material removal tool (1) comprising a base body (8), having a circular bottom face and an axis of symmetry passing through the center of the circular bottom face and perpendicular thereto, a top (7) opposite and spaced apart from the bottom face and being, at least in part, of circular shape, and a side face (9);

a chip face provided on the top (7), which with the side face (9) defines a cutting edge (14) and against which, in use, forces acting in circumferential direction may occur, having a tendency to rotate the cutting bit (3);

an opening (11) formed in the base body (8) passing essentially coaxially through the base body (8) for receiving an attaching element (12), to secure on, and press the cutting bit (8) on the material removal tool with the cutting bit bottom face (6) of the base body engaging a seat face (23) provided on the material removal tool (1); and wherein said top has means for preventing relative rotation of the base body (8) with respect to the seat face (23) of the material removal tool (1) under forces arising in operation of the material removal tool comprising a group of interengaging, interlocking surface formations consisting essentially of protrusions or recesses (13) on the top (7), of the base body, and located on a theoretical circle concentric to said axis of symmetry, for engagement with a complementary securing means having complementary recesses or protrusions, connectable to the material removal tool (1), for restraining and securing said cutting bit (3) with respect to rotation about said axis of symmetry relative to the material removal tool (1).

2. The cutting bit of claim 1, wherein the base body (8) has a circular cross section located between the bottom face (8) and the top (7).

3. The cutting bit of claim 1, wherein a cross section located on the top (7) and bounded by the cutting edge (14) is circular.

4. The cutting bit of claim 1, wherein the bottom face (6) is circular.

5. The cutting bit of claim 1, wherein the base body (8) is essentially frustoconical.

6. The cutting bit of claim 1, wherein the bottom face (6) is parallel to the top (7).

7. The cutting bit of claim 1, wherein the bottom face (6) is planar.

8. The cutting bit of claim 1, wherein the chip face (15) is a circular-annular face adjoining the cutting edge (14).

9. The cutting bit of claim 1, wherein the chip face (15) is planar.

10. The cutting bit of claim 1, wherein the chip face (15) is located on a jacket of a circular cone and forms an acute angle with the top (7).

11. The cutting bit of claim 1, wherein the chip face (15) is spherically curved.

12. The cutting bit of claim 1, wherein the surface formations comprise said recesses (13).

13. The cutting bit of claim 1, wherein said surface formations comprise said protrusions.

14. The cutting bit of claim 12, wherein the surface formations (13) include a group of said recesses (13) or protrusions spaced from each other and located inwardly of the outer circumference of the top (7).

15. The cutting bit of claim 14, wherein said recesses (13) or protrusions of the group form identical angles with one another relative to the axis of symmetry.

16. The cutting bit of claim 15, wherein a total of six of said recesses (13) or protrusions are provided, and the angle between adjacent recesses (13) or protrusions each is 60°.

17. The cutting bit of claim 1, wherein the surface formations (13) are located at least intermittently spaced on the chip face (13).

18. The cutting bit of claim 12, wherein the recesses (13) are formed in a plane that is parallel to the bottom face (6) is oval.

19. The cutting bit of claim 1, wherein at least one recess of the group is of oval shape (13) and has a longitudinal center axis (28, 29) which extends radially to the base body (8).

20. The cutting bit of claim 12, wherein at least one recess (13) of the group has a bottom which merges at an obtuse angle with the remainder of the top (7) of the base body (8).

21. The cutting bit of claim 12, wherein at least one recess (13) of the group is spherically curved in concave manner.

22. The cutting bit of claim 12, wherein at least one recess (41) of the group has side walls (44) oriented crosswise to the circumferential direction of the base body (8).

23. The cutting bit of claim 1, wherein the cutting bit (3) has at least one marker device (30, 31) enabling the identification of its rotational position.

24. The cutting bit of claim 1,
in combination with
the material removal tool (1), having a tool body (2), which has at least one receptacle (4) with said seat face (23);
wherein the cutting bit (3) is received on the seat face (23);
and the securing means (19) is provided, connectable to the tool body (2), and in engagement with the surface formations (13) on the cutting bit (3).

25. The combination of claim 24, wherein the securing means (19), on its side (17) toward the cutting bit (3), has a portion (34) formed in complementary fashion to the surface formations (13) for interengaging, interlocking coupling with said surface formations.

26. The combination of claim 25, wherein the securing means is an elongated clamping claw (19) with a central securing opening (37), next to which a first portion (34), formed in complementary shape to the surface formations (13) is provided on one side (17) of the central securing opening and a second portion formed in complementary shape to the surface formations of another cutting bit (3) or with the tool body (2), is provided on the opposite side of the central securing opening (37).

27. The combination of claim 24, wherein the material removal tool (1) is a milling tool head (1).

28. The cutting bit of claim 1, wherein said base body (8), in a region located between bottom face (6) and the top (7) has a portion which is parallel to the bottom face and which, at least in part, is of circular cross-section.

29. The combination of claim 24, wherein said surface formations comprise said recesses (13), and the securing means comprises a clamping claw (19) having protrusions complementary to said recesses.

30. The combination of claim 24, wherein said surface formations comprise protrusions (13), and the securing means comprises a clamping claw (19) having recesses complementary to said protrusions.

31. The combination of claim 24, wherein the securing means is a two-arm clamping claw (19) having claw surface formations on said arms; and the tool body (2) has a body surface formation complementary to the claw surface formation on one of the arms of the claw (19).

* * * * *